United States Patent [19]
Bender

[11] 3,822,508
[45] July 9, 1974

[54] DEVICE FOR CHIP REMOVING MACHINING OF TROCHOIDAL MANTLE SURFACES

[75] Inventor: Albert Bender, Nellingen, Germany

[73] Assignee: Maschinenfabrik Gehring KG, Nellingen, Germany

[22] Filed: May 2, 1973

[21] Appl. No.: 356,483

[30] Foreign Application Priority Data
May 5, 1972 Germany........................2221576

[52] U.S. Cl.................. 51/34 R, 51/100 R, 82/1.3, 90/31
[51] Int. Cl....... B24b 17/02, B24b 7/00, B24b 9/00
[58] Field of Search............ 51/34 R, 100 R, 101 R, 51/338, 349; 82/1.3; 90/30, 31; 408/54

[56] References Cited
FOREIGN PATENTS OR APPLICATIONS
1,045,841  12/1958  Germany........................... 51/100 R
1,161,105  1/1964  Germany............................... 81/1.3

Primary Examiner—Othell M. Simpson
Attorney, Agent, or Firm—Walter Becker

[57] ABSTRACT

A device for machining trochoidal mantle surfaces, especially the inner epitrochoidal surface of circular piston machines, in which a tool body rotatable about its central axis and provided with bores parallel to the central axis is by means of a cycloidal transmission comprising a rolling path body and arranged in axial alignment with the central axis of the tool body operatively connected to rotatable members journalled in the bores of the tool body and in rolling engagement with the rolling path body. Each of the rotatable members has an eccentric bore therethrough through which extend tool holding elements which by a control mechanism carry out a movement around the above mentioned central axis and simultaneously a pivotal movement in the eccentric bore of the pertaining rotatable member.

21 Claims, 2 Drawing Figures

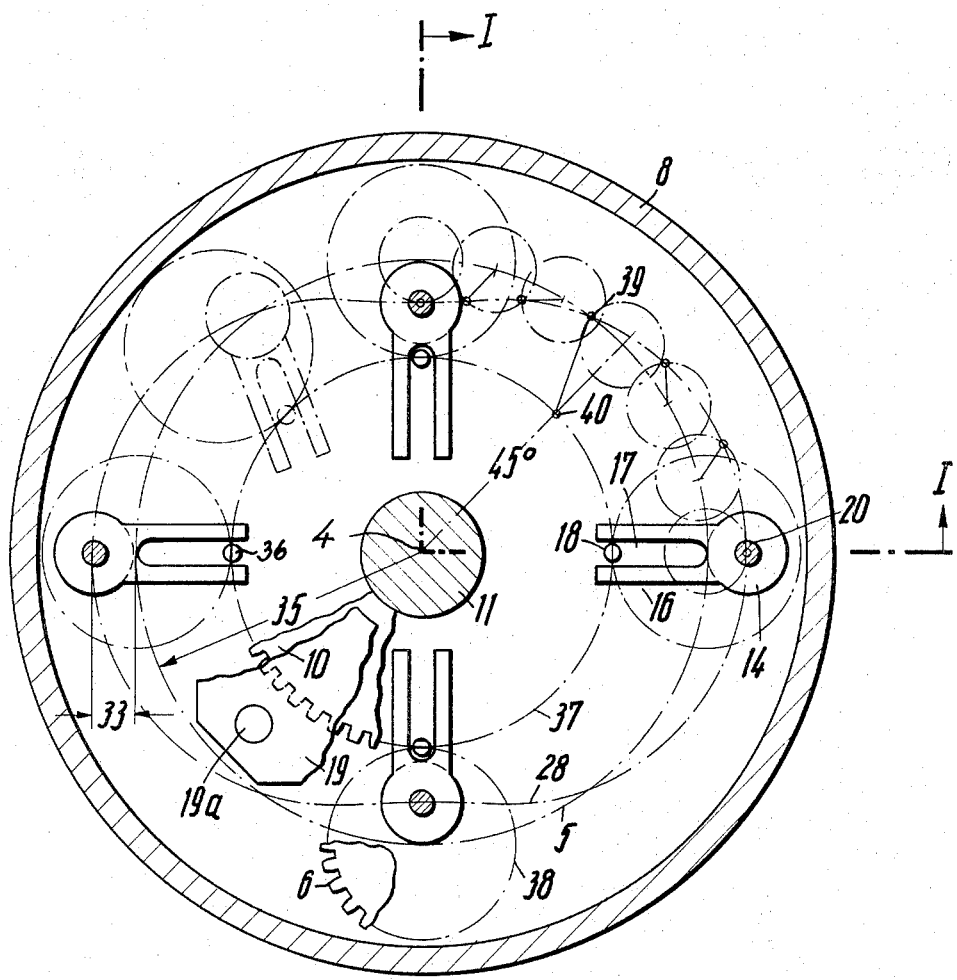

DEVICE FOR CHIP REMOVING MACHINING OF TROCHOIDAL MANTLE SURFACES

The present invention relates to a device for machining trochoidal mantle surfaces, especially the inner epitrochoidal surface of circular piston machines or the like, by means of a tool the tool body of which is rotatable about the machining axis relative to the surface to be machined and has mounted thereon at least one machining element, for instance a honing stone, which is movable transverse to the axis of rotation of the tool body, while the holding means for the honing stone is controlled by means of a mechanical transmission as to its radial movement relative to the machining axis.

A device has become known which produces the trochoidal shape kinematically in a manner which corresponds to the operation of the triangle rotor in circualr piston motors. Such a device, however, is suitable only when employing point-shaped cutters or machining surfaces inasmuch as the tool during its rotation moves out of its optimum position relative to the machining surface by up to an angle of 25°. For this reason a device of this type cannot be used for machining by means of honing strips which have a surface engagement.

It is, therefore, an object of the present invention to design a device of the above described general character in such a way that a precise control of the machining element will be assured and that no pivoting of the machining element from its optimum position relative to the machining surface will occur.

This object and other objects and advantages of the present invention will appear more clearly from the following specification in connection with the accompanying drawings, in which:

FIG. 2 represents a section taken along the line II — II of FIG. 1.

Figure 1:
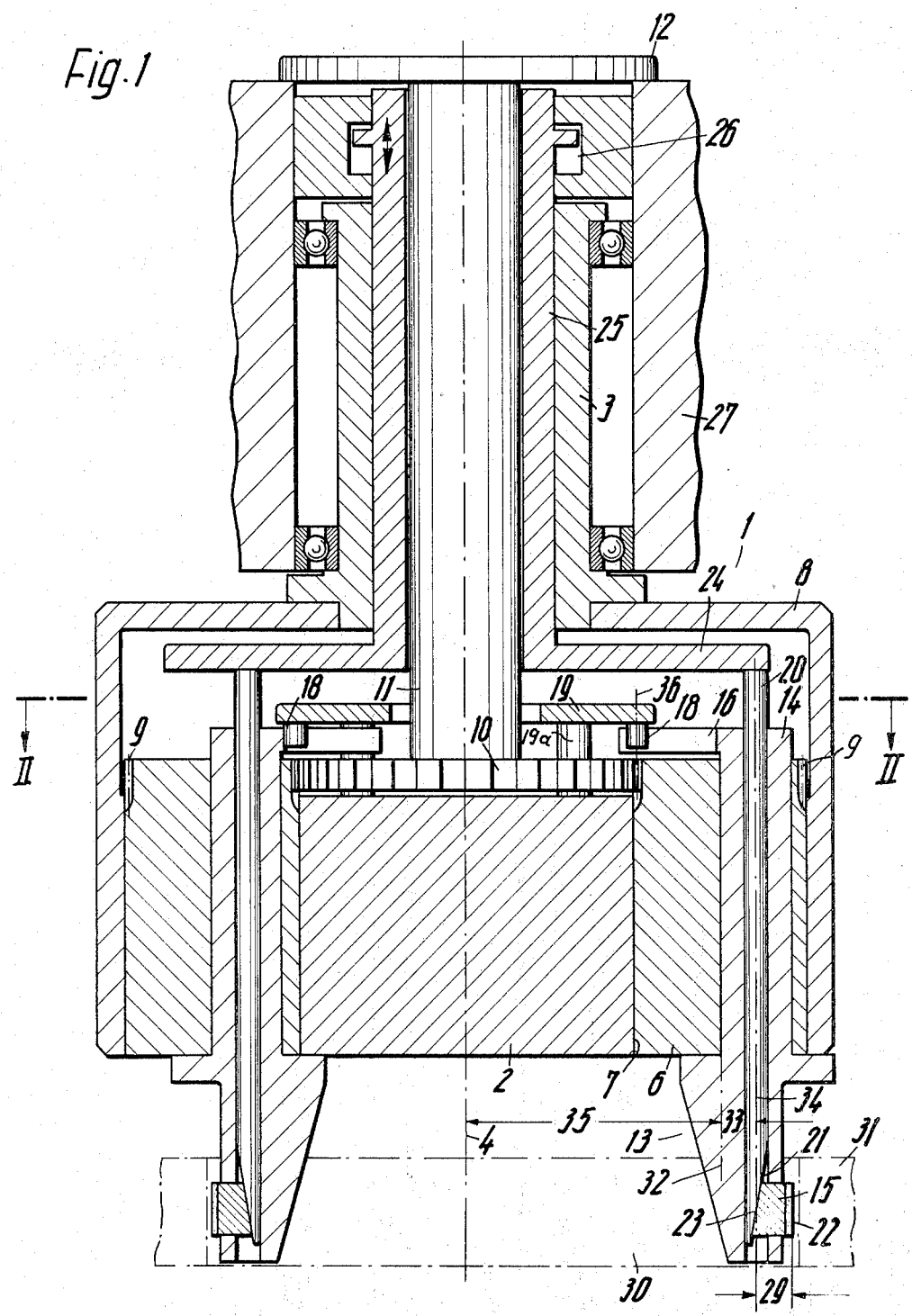
FIG. 1 is an axial section through a device according to the invention.

The device according to the present invention is characterized primarily in that the transmission for controlling the holding means for the honing stone as to its radial movement relative to the machining axis is formed by a cycloidal transmission with a rolling path body located in the machining axis, while a roll body is in rolling engagement with the rolling path for the holding means of the respective machining element. The holding means for the machining element is mounted on the roll body, and the rolling path body is, in order to be non-rotatable relative to the machining surface, rotatably journalled relative to the tool body.

According to a further feature of the invention, the holding means for the machining element is for varying the angular position thereof relative to the rolling path movably journalled on the roll body and is operatively connected to a control device so that the angular position of the machining element can be varied in such a way that with each angular position of the tool, it will occupy a desired optimum relative position with regard to the machining surface.

A simple mounting of the holding means is obtained when the latter is pivotable about an axis which is parallel to the axis of the roll body and is arranged in spaced relationship thereto.

According to a preferred embodiment of the invention, the control device comprises a control element which is non-rotatably connected to the holding means for the machining element. This last mentioned control element is pivotable about a control axis that is parallel to the machining axis and is radially displaceable relative to the control axis while being adapted to be coupled to the tool body, the control axis preferably being located in the rolling path.

Inasmuch as all normals of the respective described path areas of the trochoid pass through the respective momentary pole, namely the contact point between the rolling path and the roll body, the machining element is always at a right angle to the respective path area located in the machining surface.

An overall small construction is obtained when the control element is fork-shaped and the control axis is formed by a control pivot engaging a slot in the control element. The control element may, for obtaining favorable lever conditions, be arranged directly adjacent to an end face of the roll body, especially that end face of the roll body which faces away from the machining element. Expediently, the control pivot is provided on an annular disc which is located in the machining axis and is non-rotatably connected to the tool body. Preferably the control pivot is provided on that side of the annular disc which faces the roll body so that the control element will be located in a protected manner between the rolling path body and the annular disc.

For a safe mounting of the holding means of the machining element, the holding means comprises a bearing mandrel which is located in a bore of the roll body while the control element is preferably provided at one end of the bearing mandrel.

The construction of the device can be further simplified by passing a shaft which carries the roll body out of one end face of the tool body, and surrounding this shaft in particular by the annular disc. This shaft serves for orienting the rolling path body relative to the workpiece. If the device is so designed that the tool rotates and the workpiece stands still, the shaft is connected, for instance, to the headstock of the machine tool. If, however, the device is so designed that the tool stands still and the workpiece rotates, the shaft is connected to a part of the pertaining machine tool which part rotates with the workpiece.

In order under all circumstances to assure a completely slip-free rolling, the rolling path body and the roll body engage each other through teeth, especially spur gears. The teeth may, for saving space, be provided only over a portion of the length of the roll body, preferably on that end section thereof which faces away from the machining element, so that the rolling path body can be designed in the shape of a disc and so that it will be possible safely to mount a portion of the length of the roller-shaped roll body, preferably that entire length thereof which is adjacent to the engaging section for the rolling path, in a bearing bore of the tool body. The bearing bore preferably has a diameter which equals approximately the outer diameter of the teeth of the rolling-off wheel, and thus a bearing diameter as large as possible and a simple way of mounting will be obtained.

For mounting the control device in a protected way, the tool body forms at one end face of that section which houses the roll body a housing for the control device and the rolling path body. For connecting the tool in a simple manner, for instance, to the working spindle of a machine tool, the tool body has one end face of the section receiving the roll body provided with a flange for connection to the working spindle or the like while the flange is formed preferably by the pertaining end wall of the housing.

According to a further feature of the invention, the machining element is mounted on the holding means and is adjustable by a feeding device transverse to the machining axis. The feeding device may be operated hydraulically, mechanically or electrically, and the feeding movement may be controlled continuously or stepwise or in conformity with a machining parameter, for instance, in conformity with the load. The feeding device and the tool may also be so designed that the machining elements are fed in groups one after the other, for instance, in such a way that one group is employed for rough machining or pre-machining, and the second group is employed for finish machining.

According to a simple embodiment of the invention, the feeding device has a feeding wedge which is longitudinally displaceable in the preferably sleeve-shaped holding means. This feeding wedge engages that side of the machining element which faces away from the working side. Expediently, the feeding wedge protrudes beyond one end of the holding means of the machining element and engages a feeding element which is displaceable parallel to the machining axis, the feeding element preferably having the shape of a disc and being located within the housing of the tool body.

For obtaining particularly favorable working conditions, a plurality of machining elements, especially four, is preferably uniformly distributed about the machining axis.

Referring now to the drawings in detail, FIGS. 1 and 2 show a device according to the present invention which comprises a honing tool the tool body 2 of which is connected to a hollow spindle 3. This hollow spindle 3 may be formed by a working spindle of a non-illustrated honing machine.

In the tool body 2, which substantially forms a body of revolution, the axis of rotation forms the machining axis 4 of tool 1. In the tool body 2 there are along a pitch circle 5 rotatably journalled four roll bodies 6 which are uniformly distributed about the machining axis 4 and are roller-shaped or sleeve-shaped. These roll bodies are rotatably journalled in bores 7 which are parallel to the machining axis 4. The roll bodies 6 are substantially flush with that end face of the tool body 2 which faces away from the working spindle 3. On that side of the tool body 2 which faces the working spindle 3, the tool body 2 forms a housing 8 the inner diameter of which is slightly larger than that diameter up to which the roll bodies 6 extend. As a result thereof, the tool body 2 forms a central section which axially is shorter than the outer section in which the bearing bores 7 are provided. The roll bodies 6 slightly protrude beyond that end face of this central section which faces toward the working spindle 3. The roll bodies 6 are at the pertaining end section provided with outer teeth 9. In the machining axis 4, directly adjacent to that side of the central section of the tool body 2 which faces toward the working spindle 3, there is provided a rolling path body in the form of a spur gear 10 which is in rolling engagement with the roll bodies 6 and, more specifically, their teeth 9. The rolling path body 10 is provided at one end of a shaft 11 which extends through the working spindle 3 and, for instance, is connected to a flange 12 on the headstock of the honing machine or the like in such a way that the rolling path body 10 does not rotate together with the tool body 2.

Each roll body 6 has eccentrically with regard to its axis of rotation arranged therein a holder 13 with a sleeve-shaped mandrel 14, the holder 13 being pivotally journalled about an axis which is parallel to the machining axis 4. Each holder 13 carries on that side thereof which faces away from the working spindle 3 and at the end which protrudes beyond the tool body 2 a honing stone 15 which is arranged in a slide slot. The honing stone 15 is with regard to the machining axis 4 radially adjustable in the holder 13. At that end of the respective mandrel 14 which faces toward the working spindle 3 and directly adjacent to the end face of the pertaining roll bodies 6 there is provided a control element in the form of a fork 16. The fork slot 17 is engaged by a control pin 18 which is parallel to the machining axis 4 in such a way that the control element 16 and the control pin 18 can be pivoted relative to each other about the axis of the control pin 18 and can be moved toward each other radially with regard to this axis.

The control pins 18 are provided on that end face of an annular disc 19 in housing 8 which faces toward the intermediate section of the tool body 2. The annular disc 19 surrounds the shaft 11 while the control elements 16 extend approximately radially between the annular disc 19 and the rolling path body 10. The annular disc 19 is by means of four connecting bolts 19a which are arranged adjacent to the outer circumference of the rolling path body 10 between the roll bodies 6 non-rotatably connected to the tool body 2.

In the pivot axis of each holder 13 there is longitudinally displaceably mounted a feeding wedge 20 which may, for instance, be formed by a cylindrical bar. The respective feeding wedge 20 engages with a wedge surface 21 arranged at its end that side 23 of the pertaining machining element 15 which faces away from the machining surface 22. The respective pertaining machining element 15 extends into the receiving bore for the feeding wedge 20. When the feeding wedge 20 is moved in its longitudinal direction, the pertaining machining element 15 is adjusted radially with regard to the machining axis 4. The feeding wedges 20 protrude beyond those ends of the holding mandrels 14 which face toward the working spindle 3 and have their end faces engage a feeding disc 24 located in the housing 8. The disc 24 has a sleeve-shaped extension 25 which is located within the working spindle 3 and surrounds the shaft 11. The sleeve-shaped extension 25 is connected to a, for instance, pressure-operable feeding device 26 which is firmly arranged in the headstock 27 of the machine tool. By an axial displacement of the feeding disc 24, the machining elements 15 are fed or advanced.

FIG. 2 shows in solid lines the trochoid 28 which is obtained by the described cycloidal transmission of the tool 1. The trochoid 28 is, however, smaller by the distance 29 than the trochoid which is obtained by the machining surface 30 of the workpiece 31 illustrated in FIG. 1. Trochoids are described by the points of a roll circle (Gangpolbahn) which rolls on a fixed base circle (Rastpolbahn) without sliding. The normal of the respective described path section of the trochoid passes through the respective contact point between roll circle and base circle. This is also true when the describing point of the trochoid is not located in the axis 32 of the roll circle but is offset relative thereto by the eccentricity 33. This eccentricity 33 is determined by the distance of the axis 32 from the pivot axis 34 of the holder 13. In addition to this factor, the cycloidal transmission has the determining factor 35 which is obtained by the distance of the axis of rotation 32 of the roll body 6 from the machining axis 4. The axis 36 of each control pin 18 is located at the point of engagement of the pertaining roll body 6 with the rolling path body 10 and thus represents a mantle line of the rolling path 37 indicated in FIG. 2 by dot-dash lines. In this way, the holders 13 are continuously so controlled that the machining elements 15 extend at a right angle with regard to the machining surface 30 or always have their entire working surface 22 in engagement with the machining surface 30. The transmission ratio between the rolling path body 10, formed by a sun wheel, and the roll bodies 6 amounts to 2:1 so that with one rotation of the spindle, each roll body 6 carries out two revolutions about its axis 32.

In the upper right-hand portion of FIG. 2 there is shown, for a clearer understanding of the invention, the pointwise construction of an epicycloid by means of rolling off the circle 38 formed by a roll body 6 on the stationary circle 37. When the circle rolling on the sun wheel 10 has its center point located on the 45° line, the eccentrically mounted holder 13 is as describing point of the epicycloid, at a right angle to the 45° line in the point 39. If this point 39 is connected to the contact point 40 of the pertaining circle 38 with the circle 37, the connecting line between the two points 39, 40 is at the point 39 at a right angle to the tangent of the trochoid 28.

The device according to the present invention or its cycloidal transmission is as to its determining factors adapted to the respective trochoid to be machined. Fundamentally, the device according to the invention is suited for machining all work pieces with trochoidal cross section, for instance, also for work pieces with outer epicycloidal surfaces or with hypocycloidal surfaces.

It is, of course, to be understood that the present invention is, by no means, limited to the specific showing in the drawings but also comprises any modifications within the scope of the appended claims.

What I claim is:

1. A device for machining trochoidal mantle surfaces, especially the inner epitrochoidal surface of circular piston machines, which includes: a tool body rotatable about its central axis and provided with passage means substantially parallel to said central axis, a cycloidal transmission comprising a rolling path body arranged in axial alignment with said central axis of rotation of said tool body, rotatable means rotatably journalled in said passage means and in rolling engagement with said rolling path body, said rotatable means having an eccentric bore therethrough parallel to said central axis, tool holding means associated with said eccentric bore and having a mandrel pivotally extending through said eccentric bore, said tool holding means being adapted to receive and hold a machining element, and control means operatively connecting said tool body to said mandrel to impart upon the latter a pivotal movement and to superimpose said pivotal movement upon the movement of said rotatable means around said central axis in response to the rotation of said tool body about its central axis.

2. A device for machining trochoidal mantle surfaces, especially the inner epitrochoidal surface of circular piston machines, which includes: a tool body rotatable about its central axis and provided with a plurality of bores substantially parallel to and uniformly distributed about said central axis, a cycloidal transmission comprising a rolling path body arranged in axial alignment with said central axis of rotation of said tool body, a plurality of roll bodies respectively rotatably journalled in said bores and in rolling engagement with said rolling path body whereby each roll body is rotated about its axis in response to the rotation of said tool body about its central axis, each of said roll bodies having an eccentric bore therethrough parallel to said central axis, a plurality of holding means respectively associated with said eccentric bores and each comprising a mandrel pivotally extending through the pertaining eccentric bore, each of said holding means being adapted to receive and hold a machining element, and control means operatively connecting said tool body to said mandrels and to impart upon said mandrels a pivotal movement and to superimpose said pivotal movement upon the movement of said roll bodies around said central axis of said tool body.

3. A device according to claim 1, in which said control means includes a control element fixedly connected to said mandrel, pivot means connected to said tool body for rotation therewith about said central axis and located on the circle of engagement defined by the rolling engagement of said rotatable means with said rolling path body, the axis of said pivot means extending parallel to said central axis and being located in radially spaced relationship to the axis of said rotatable means and the axis of said mandrel, said control element being pivotable about said pivot means and being radially movable relative to said pivot means.

4. A device according to claim 3, in which said control element is fork-shaped and has the fork prongs slidably straddling said pivot means.

5. A device according to claim 3, in which said control element is arranged adjacent that end face of said rotatable means which is adjacent said rolling path body.

6. A device according to claim 4, which includes annular disc means connected to said tool body for rotation therewith and carrying said pivot means.

7. A device according to claim 6, in which said control element is located between said rolling path body and said annular disc means.

8. A device according to claim 2, in which said control means includes annular disc means connected to said rotatable tool body for rotation therewith and provided with a plurality of pivot means corresponding in number to the number of said roll bodies and extending in a direction toward that end face of said roll bodies which is adjacent said rolling path body, said control means also including a plurality of fork-shaped elements respectively connected to one end portion of said mandrels and having a pair of prongs respectively slidably straddling said pivot means while being movable radially relative to the pertaining pivot means.

9. A device according to claim 8, in which the other end portions of said mandrels have connected thereto means for receiving and supporting a machining element.

10. A device according to claim 8, which includes shaft means centrally connected to an end face of said tool body and extending through said annular disc means, said shaft means being connectable to a rotatable drive member.

11. A device according to claim 1, in which said rotatable means and said rolling path body have those portions thereof which are in rolling engagement with each other formed by interengaging teeth.

12. A device according to claim 11, in which the teeth of said rotatable means extend over only a portion of the length of said rotatable means.

13. A device according to claim 1, in which said rolling path body is disc-shaped.

14. A device according to claim 2, in which said roll bodies and said rolling path body have those portions thereof which are in rolling engagement with each other formed by interengaging teeth, and in which the diameter of said bores respectively receiving said roll bodies substantially equals the outer diameter of the teeth-equipped portion of said roll bodies.

15. A device according to claim 2, in which the outer peripheral portion of said tool body has an annular extension forming a housing surrounding said control means and said rolling path body.

16. A device according to claim 15, in which said annular extension has a radially inwardly extending flange for for connection with a working spindle.

17. A device according to claim 2, in which the holding means for receiving and holding a machining element includes a feeding device operable to adjust a machining element received by said holding means in a direction transverse to said central axis.

18. A device according to claim 17, in which said feeding device includes a plurality of longitudinal adjusting members respectively extending through said mandrels and each provided with a wedge-shaped section for engagement with a machining element, said adjusting members being displaceable in their longitudinal direction.

19. A device according to claim 18, in which said adjusting members protrude beyond that end face of their pertaining mandrel which is adjacent said rolling path body, and which includes actuating means engaging said protruding portions of said adjusting members and being operable to bring about a longitudinal adjustment of said adjusting members and thereby of said wedge-shaped sections.

20. A device according to claim 19, in which said adjusting means is common to all of said adjusting members.

21. A device according to claim 2, which includes four roll bodies uniformly distributed around said central axis.

* * * * *